(12) United States Patent
Lee et al.

US010873964B2

(10) Patent No.: US 10,873,964 B2
(45) Date of Patent: Dec. 22, 2020

(54) METHOD AND APPARATUS FOR TRANSMITTING OR RECEIVING UPLINK SIGNAL FOR TERMINAL SUPPORTING MULTIPLE TTIS, MULTIPLE SUBCARRIER SPACINGS, OR MULTIPLE PROCESSING TIMES IN WIRELESS COMMUNICATION SYSTEM

(71) Applicant: LG Electronics Inc., Seoul (KR)

(72) Inventors: Hyunho Lee, Seoul (KR); Daesung Hwang, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,705

(22) PCT Filed: Mar. 9, 2018

(86) PCT No.: PCT/KR2018/002837
§ 371 (c)(1),
(2) Date: Dec. 13, 2018

(87) PCT Pub. No.: WO2018/174450
PCT Pub. Date: Sep. 27, 2018

(65) Prior Publication Data
US 2020/0008227 A1 Jan. 2, 2020

Related U.S. Application Data

(60) Provisional application No. 62/475,853, filed on Mar. 23, 2017, provisional application No. 62/492,096, (Continued)

(51) Int. Cl.
*H04W 72/12* (2009.01)
*H04L 1/18* (2006.01)
(Continued)

(52) U.S. Cl.
CPC ....... *H04W 72/1284* (2013.01); *H04L 1/1812* (2013.01); *H04W 28/0278* (2013.01); *H04W 72/0446* (2013.01)

(58) Field of Classification Search
CPC .................................................. H04W 72/1284
See application file for complete search history.

(56) References Cited

U.S. PATENT DOCUMENTS

2015/0036601 A1* 2/2015 Kim ...................... H04L 5/0048
370/329
2015/0327231 A1* 11/2015 Wang ....................... H04J 11/00
370/329

(Continued)

OTHER PUBLICATIONS

Panasonic, "UL simultaneous transmission between sTTI and TTI," R1-1612108, 3GPP TSG RAN WG1 Meeting #87, Reno, USA, Nov. 4, 2016.

(Continued)

*Primary Examiner* — Samina F Choudhry
(74) *Attorney, Agent, or Firm* — Fish & Richardson P.C.

(57) ABSTRACT

A method of transmitting a scheduling request (SR) for a user equipment (UE) for supporting a plurality of transmission time interval (TTI) lengths in a wireless communication system is performed by the UE and includes receiving downlink data, and transmitting hybrid automatic retransmission request-acknowledgement/non-acknowledgement (HARQ-ACK) in a first physical uplink control channel (PUCCH) with a first TTI length for transmitting HARQ-ACK corresponding to the downlink data when transmission timings of the first PUCCH and a second PUCCH for transmitting SR overlap with each other, wherein, when the first PUCCH includes a smaller number of symbols than the second PUCCH and the first PUCCH does not include an effective SR resource, the SR is not transmitted.

20 Claims, 9 Drawing Sheets

(a)

(b)

Related U.S. Application Data filed on Apr. 28, 2017, provisional application No. 62/543,382, filed on Aug. 10, 2017, provisional application No. 62/557,111, filed on Sep. 11, 2017, provisional application No. 62/574,133, filed on Oct. 18, 2017, provisional application No. 62/580,965, filed on Nov. 2, 2017.

(51) Int. Cl.
*H04W 28/02* (2009.01)
*H04W 72/04* (2009.01)

(56) References Cited

U.S. PATENT DOCUMENTS

| | | | |
|---|---|---|---|
| 2017/0041923 A1* | 2/2017 | Park | H04L 5/001 |
| 2017/0215198 A1* | 7/2017 | Chen | H04W 72/1205 |
| 2017/0290008 A1* | 10/2017 | Tooher | H04L 1/0007 |

OTHER PUBLICATIONS

Intel Corporation, "Scheduling request design for NR," R1-1700370, 3GPP TSG RAN WG1 NR Ad-Hoc Meeting, Spokane, USA, Jan. 10, 2017.
Panasonic, "Discussion on uplink control channel for NR," R1-1700543, 3GPP TSG RAN WG1 NR Ad-Hoc Meeting, Spokane, USA, Jan. 25, 2017.
Huawei, "Discussion on SR for shortened TTI," R1-1703070, 3GPP TSG RAN WG1 Meeting #88, Athens, Greece, Feb. 6, 2017.
Huawei, "SR and BSR procedure in short TTI," R2-1701887, 3GPP TSG-RAN WG2 Meeting #97, Athens, Greece, Feb. 4, 2017.
Huawei, "Handling collisions of sTTI/TTI in UL," R1-1701741, 3GPP TSG RAN WG1 Meeting #88, Athens, Greece, Feb. 13-17, 2017, 9 pages.
Panasonic, "UL simultaneous transmission between sTTI and TTI," R1-1701934, 3GPP TSG RAN WG1 Meeting #88, Athens, Greece, Feb. 13-17, 2017, 3 pages.
CATT, "sPUCCH design for sTTI," R1- 1702051, 3GPP TSG RAN WG1 Meeting #88, Athens, Greece, Feb. 13-17, 2017, 6 pages.
LG Electronics, "Discussion on grant-based and grant-free UL transmissions for latency," R1-1702490, 3GPP TSG RAN WG1 Meeting #88, Athens, Greece, Feb. 13-17, 2017, 9 pages.
NTT Docomo, Inc., "DMRS-based vs. Sequence-based PUCCH in short duration," R1-1702811, R1-1702490, 3GPP TSG RAN WG1 Meeting #88, Athens, Greece, Feb. 13-17, 2017, 9 pages.
Intel Corporation, "Remaining details of PUCCH Formats," 'R1-156505', 3GPP TSG-RAN WG1 #83, Anaheim, USA, Nov. 15-22, 2015, 5 pages.
Notice of Allowance in Korean Application No. 10-2018-7017035, dated Nov. 16, 2018, 2 pages (with English Translation).
LG Electronics, "Discussion on UL collision handling between TTI and sTTI," R1-1713067, 3GPP TSG RAN WG1 Meeting #90, Prague, Czech Republic, Aug. 21-25, 2017, 7 pages.
Ericsson, "Handling collisions of sTTI and TTI in UL," R1-1712893, 3GPP TSG-RAN WG1 Meeting #90, Prague, Czech Republic, Aug. 21-25, 2017, 7 pages.
Qualcomm Incorporated, "Collision of sTTI/TTI in UL," R1-1712777, 3GPP TSG RAN WG1 #90, Prague, Czech Republic, Aug. 21-25, 2017, 5 pages.
Intel Corporation , "Collision handling for UL sTTI and normal TTI transmissions," R1-1712469, 3GPP TSG-RAN WG1 #90, Prague, Czechia, Aug. 21-25, 2017, 3 pages.
ZTE, "Collision handling of 1ms TTI and sTTI in uplink," R1-1712321, 3GPP TSG RAN WG1 Meeting #90, Prague, Czech Republic, Aug. 21-25, 2017, 8 pages.
Huawei, HiSilicon, "Handling collisions of sTTI/TTI in UL," R1-1712074, 3GPP TSG RAN WG1 Meeting #90, Prague, Czech Republic, Aug. 21-25, 2017, 7 pages.
LG Electronics, "Email discussion[90-12] on sPUSCH/sPUCCH power control and remaining issues on collisions in UL," R1-1717247, 3GPP TSG RAN WG1 Meeting #90bis, Prague, Czech Republic, Oct. 9-13, 2017, 37 pages.
ZTE, Sanechips, "Collision handling of 1ms TTI and sTTI in uplink," R1-1717697, 3GPP TSG RAN WG1 Meeting #90bis, Prague, Czech Republic, Oct. 9-13, 2017, 7 pages.
LG Electronics, "Email discussion [90-12] on sPUSCH/sPUCCH power control and remaining issues on collisions in UL," R1-1718793, 3GPP TSG RAN WG1 Meeting #90bis, Prague, Czech Republic, Oct. 9-13, 2017, 37 pages.
Huawei, HiSilicon, "Handling collision between PUCCH and sPUCCH," R1-1611164, 3GPP TSG RAN WG1 Meeting #87, Reno, USA, dated Nov. 14-18, 2016, 4 pages.
Ericsson, "sPUCCH resource management," R1-1703263, 3GPP TSG-RAN WG1 #88, Athens, Greece, dated Feb. 13-17, 2017, 7 pages.
Ericsson, "On the operation with different TTI lengths," R1-165299, 3GPP TSG-RAN WG1 #85, Nanjing, P.R. China, dated May 23-27, 2016, 5 pages.
Ericsson, "sPUCCH resource management," R1-1611518, 3GPP TSG-RAN WG1 #87, Reno, USA, dated Nov. 14-18, 2016, 11 pages.
Japanese Office Action in Japanese Application No. 2019-534626, dated Jan. 28, 2020, 5 pages (with English translation).

\* cited by examiner

FIG. 7
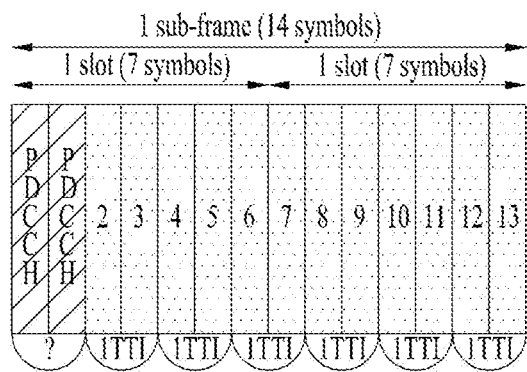
(a) 2 symbol TTI DL structure
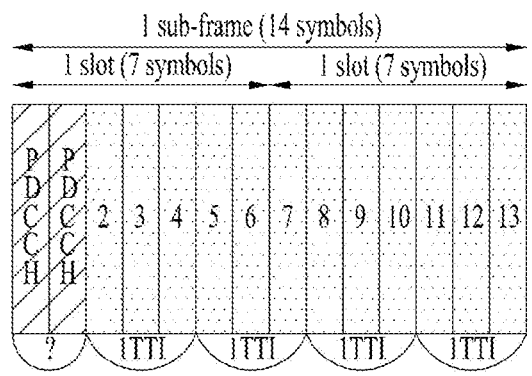
(b) 3 symbol TTI DL structure
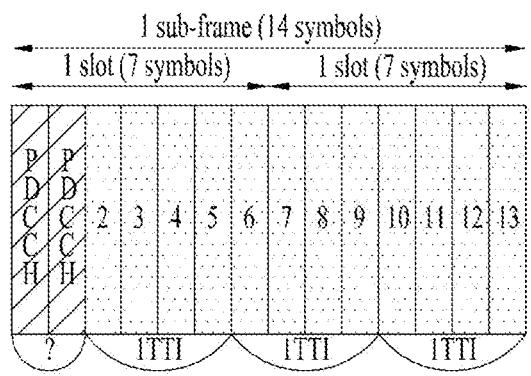
(c) 4 symbol TTI DL structure
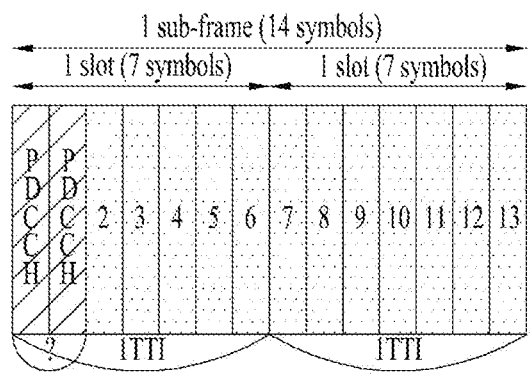
(d) 7 symbol TTI DL structure

METHOD AND APPARATUS FOR TRANSMITTING OR RECEIVING UPLINK SIGNAL FOR TERMINAL SUPPORTING MULTIPLE TTIS, MULTIPLE SUBCARRIER SPACINGS, OR MULTIPLE PROCESSING TIMES IN WIRELESS COMMUNICATION SYSTEM

CROSS-REFERENCE TO RELATED APPLICATIONS

This application is a National Stage application under 35 U.S.C. § 371 of International Application No. PCT/KR2018/002837, filed on Mar. 9, 2018, which claims the benefit of U.S. Provisional Application No. 62/475,853, filed on Mar. 23, 2017, U.S. Provisional Application No. 62/492,096, filed on Apr. 28, 2017, U.S. Provisional Application No. 62/543,382, filed on Aug. 10, 2017, U.S. Provisional Application No. 62/557,111, filed on Sep. 11, 2017, U.S. Provisional Application No. 62/574,133, filed on Oct. 18, 2017, and U.S. Provisional Application No. 62/580,965, filed on Nov. 2, 2017. The disclosures of the prior applications are incorporated by reference in their entirety.

TECHNICAL FIELD

The present invention relates to a wireless communication system, and more particularly, to a method and apparatus for supporting a plurality of transmission time intervals, a plurality of subcarrier spacing, or a plurality of processing times.

BACKGROUND ART

Latency of packet data is one of important performance metrics and one of important objectives in designs of a next-generation mobile communication system as well as LTE, a so-called new RAT, is to reduce latency and to provide rapider Internet access to an end user.

DISCLOSURE

Technical Problem

An object of the present invention devised to solve the problem lies in an uplink (UL) transmitting operation of a user equipment (UE) for supporting a plurality of transmission time intervals, a plurality of subcarrier spacing, or a plurality of processing times or a UL receiving operation of an eNB that communicates with the UE.

It is to be understood that both the foregoing general description and the following detailed description of the present invention are exemplary and explanatory and are intended to provide further explanation of the invention as claimed.

Technical Solution

The object of the present invention can be achieved by providing a method of transmitting a scheduling request (SR) for a terminal for supporting a plurality of transmission time interval (TTI) lengths in a wireless communication system, the method being performed by the terminal and including receiving downlink data, and transmitting a hybrid automatic retransmission request-acknowledgement/non-acknowledgement (HARQ-ACK) on a first physical uplink control channel (PUCCH) with a first TTI length for transmitting the HARQ-ACK corresponding to the downlink data when transmission timings of the first PUCCH and a second PUCCH for transmitting SR overlap with each other. When the first PUCCH includes a smaller number of symbols than the second PUCCH and the first PUCCH does not include an effective SR resource, the SR may not be transmitted. Here, when the first PUCCH includes an effective SR resource, the SR may be transmitted on the first PUCCH.

Additionally or alternatively, the SR may include a request or a resource configuration request for uplink transmission that does not require uplink grant.

Additionally or alternatively, the SR may be represented by a plurality of bits; and each state represented by the plurality of bits may be linked with a HARQ process number associated the uplink transmission.

Additionally or alternatively, the SR may be represented by a plurality of bits; and a HARQ process number associated with the uplink transmission may be determined according to a combination of the plurality of bits and a resource for transmitting the uplink transmission.

Additionally or alternatively, when transmission timings of the SR and the HARQ-ACK and a transmission timing of buffer state report (BSR) overlap with each other, two types of information of the SR, the HARQ-ACK, and the BSR may be bundled and mapped to a state of a modulation symbol to be transmitted.

Additionally or alternatively, when transmission timings of the SR and the HARQ-ACK and a transmission timing of buffer state report (BSR) overlap with each other, all of the SR, the HARQ-ACK, and the BSR may be transmitted on a first PUCCH using a modified PUCCH format or a larger number of resource blocks.

Additionally or alternatively, the SR may be for a specific service or specific requirement and a time interval or period of the effective SR resource may be shorter than a time interval or period of an SR resource for general data traffic.

In another aspect of the present invention, provided herein is a terminal for transmitting a scheduling request (SR) for the UE for supporting a plurality of transmission time interval (TTI) lengths in a wireless communication system, the terminal including a receiver and a transmitter, and a processor that controls the receiver and the transmitter, wherein downlink data is received, a hybrid automatic retransmission request-acknowledgement/non-acknowledgement (HARQ-ACK) is transmitted in a first PUCCH with a first TTI length for transmitting the HARQ-ACK corresponding to the downlink data when transmission timings of the first PUCCH and a second PUCCH for transmitting SR overlap with each other, and when the first PUCCH includes a smaller number of symbols than the second PUCCH and the first PUCCH does not include an effective SR resource, the SR is not transmitted.

Additionally or alternatively, the SR may include a request or a resource configuration request for uplink transmission that does not require uplink grant.

Additionally or alternatively, the SR may be represented by a plurality of bits; and each state represented by the plurality of bits may be linked with a HARQ process number associated the uplink transmission.

Additionally or alternatively, the SR may be represented by a plurality of bits, and a HARQ process number associated with the uplink transmission may be determined according to a combination of the plurality of bits and a resource for transmitting the uplink transmission.

Additionally or alternatively, when transmission timings of the SR and the HARQ-ACK and a transmission timing of buffer state report (BSR) overlap with each other, two types of information of the SR, the HARQ-ACK, and the BSR may be bundled and mapped to a state of a modulation symbol to be transmitted.

Additionally or alternatively, when transmission timings of the SR and the HARQ-ACK and a transmission timing of buffer state report (BSR) overlap with each other, all of the SR, the HARQ-ACK, and the BSR may be transmitted on a first PUCCH using a modified PUCCH format or a larger number of resource blocks.

Additionally or alternatively, the SR may be for a specific service or specific requirement and a time interval or period of the effective SR may be smaller than a time interval or period of an SR resource for general data traffic.

In another aspect of the present invention, provided herein is a method of receiving transmitting a scheduling request (SR) for a terminal for supporting a plurality of transmission time interval (TTI) lengths in a wireless communication system, the method being performed by a base station (BS) and including transmitting downlink data and receiving a hybrid automatic retransmission request-acknowledgement/non-acknowledgement (HARQ-ACK) in a first physical uplink control channel (PUCCH) with a first TTI length for transmitting HARQ-ACK corresponding to the downlink data when transmission timings of the first PUCCH and a second PUCCH for transmitting SR overlap with each other, wherein, when the first PUCCH includes a smaller number of symbols than the second PUCCH and the first PUCCH does not include an effective SR resource, the SR may not be received.

It is to be understood that both the foregoing general description and the following detailed description of the present invention are exemplary and explanatory and are intended to provide further explanation of the invention as claimed.

Advantageous Effects

According to embodiments of the present invention, uplink transmission of a terminal for supporting a plurality of transmission time interval (TTI) lengths, a plurality of subcarrier spacing, or a plurality of processing times may be effectively performed.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 7 is a diagram showing a DL subframe structure including a short TTI with a plurality of lengths (symbol numbers);

BEST MODE

Figure 1:
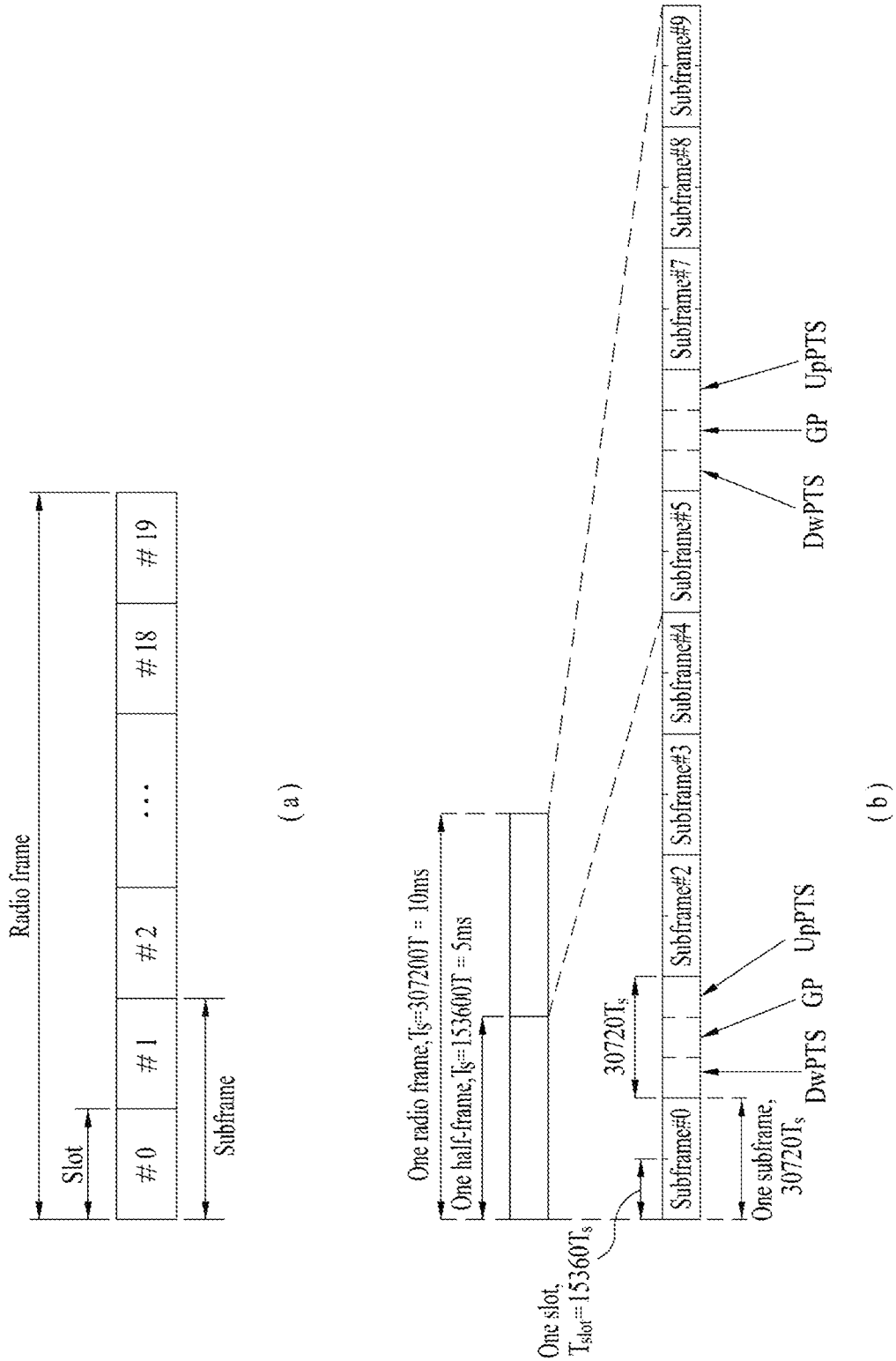
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

Figure 2:
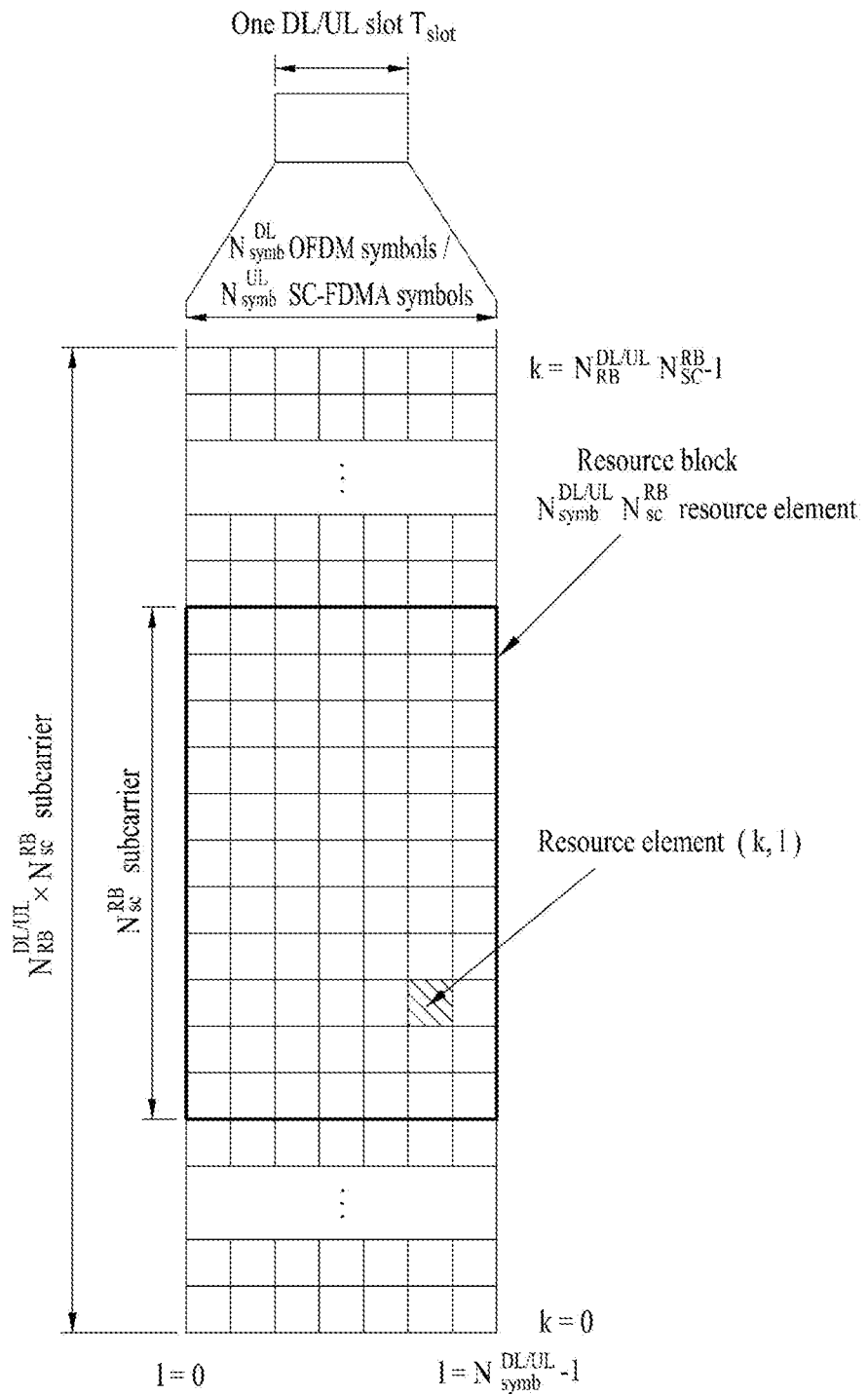
FIG. 2 is a diagram showing an example of a downlink/uplink (DL/UL) slot structure in a wireless communication system.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair.

Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
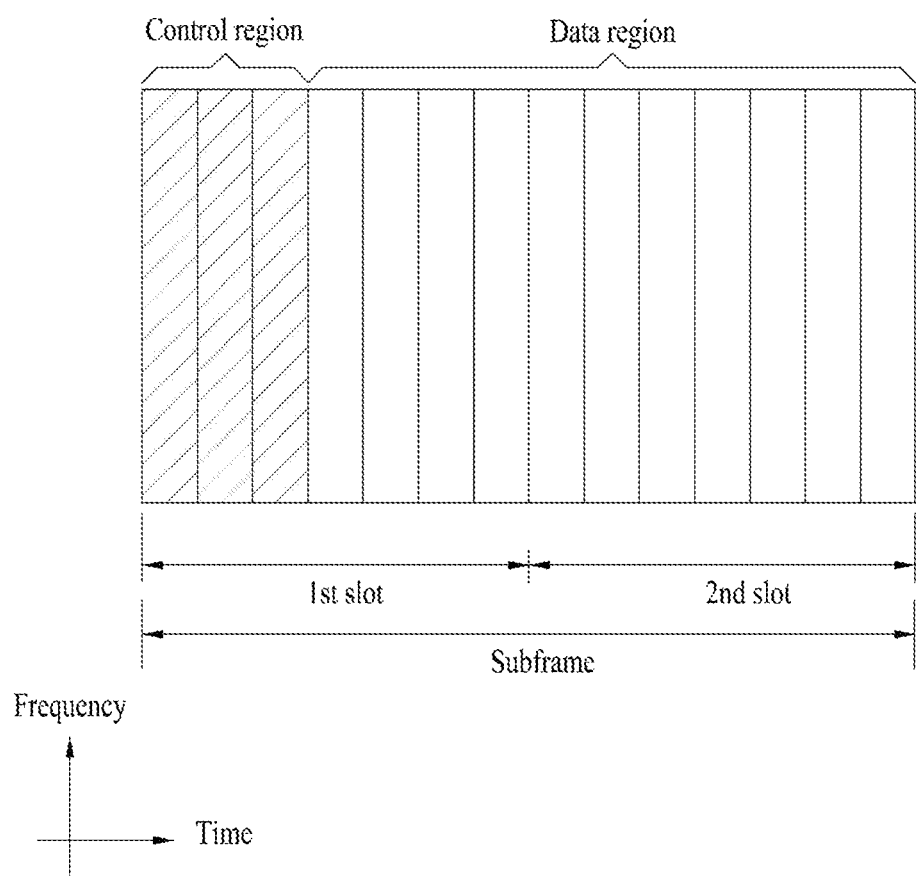
FIG. 3 is a diagram showing an example of a DL subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of |
|---|---|---|---|
| Type | Aggregation Level L | Size [in CCEs] | PDCCH candidates $M^{(L)}$ |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
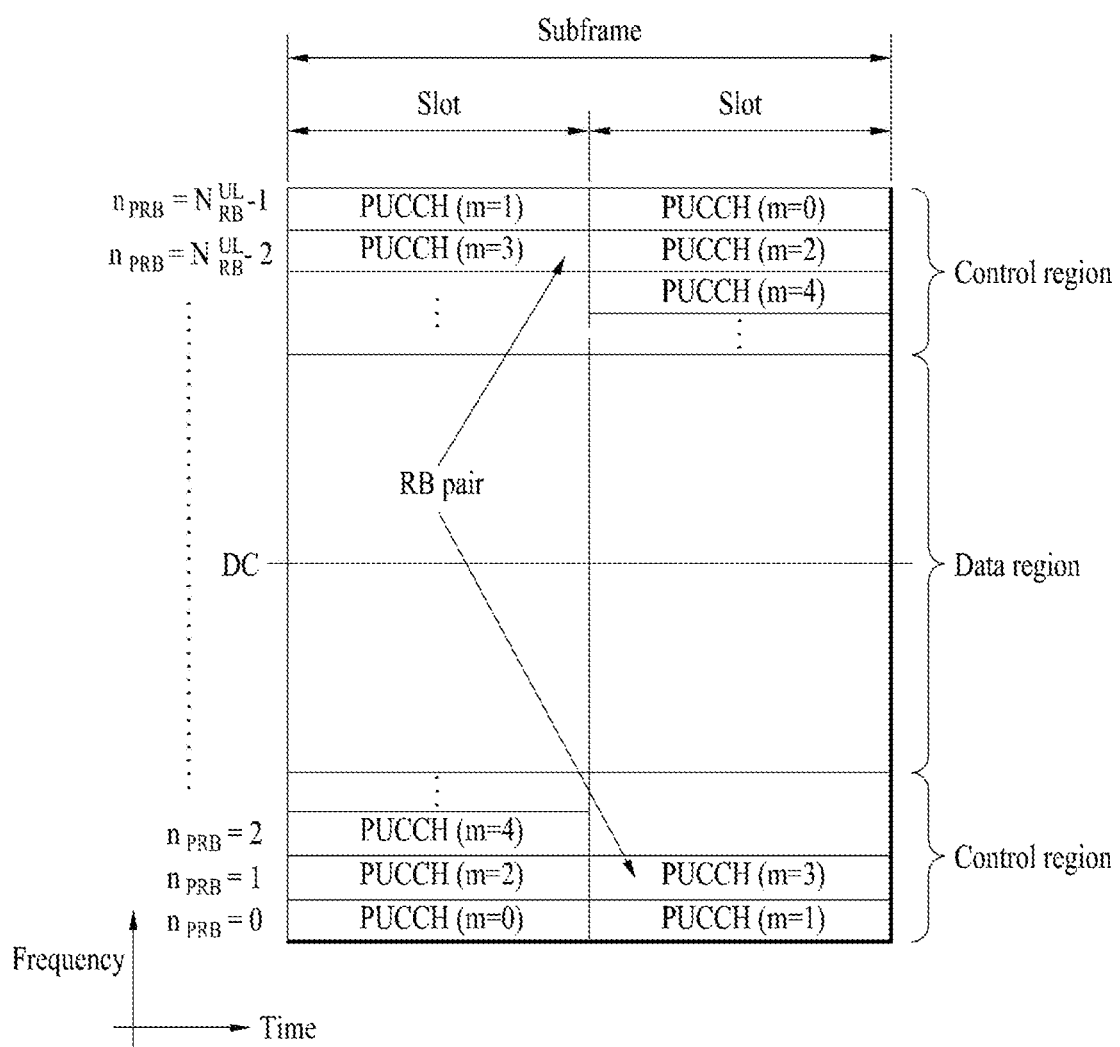
FIG. 4 is a diagram showing an example of a UL subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Scheduling Request (SR)

SR may be used to make a request for UL-SCH resources for new transmission.

When SR is triggered, the triggered SR needs to be considered as pending until it is canceled. When MAC PDU is assembled and this PDU includes a BSR which contains buffer status up to a last event that triggered a BSR, or when UL grant(s) can accommodate all pending data available for transmission, all pending SR(s) need to be canceled and sr-ProhibitTimer needs to be stopped.

When SR is triggered and there is no other SR pending, a MAC entity shall set SR_COUNTER to 0.

As long as one SR is pending, the MAC entity:
when no UL-SCH resources are available for transmission in this TTI:
when the MAC entity has no valid PUCCH resource for SR configured in any TTI: initiate a random access procedure on sPCell and cancel all pending SRs for each TTI.

else if the MAC entity has a valid PUCCH resource for SR configured for this TTI, this TTI is not part of a measurement gap, and if sr-ProhibitTimer is not running:
if SR_COUNTER<dsr-TransMax:
increment SR_COUNTER by 1;
instruct the physical layer to signal the SR on PUCCH; and
start sr-ProhibitTimer.
else:
notify RRC to release PUCCH/SRS for all serving cells;
clear any configured DL assignments and UL grants; and
initiate a random access procedure on SpCell and cancel all pending SRs.

In addition, the SR may be transmitted in a resource for SR on a pre-configured PUCCH. The resource for SR may be generated every $n^{th}$ subframe and may be represented by a PUCCH resource index. For a UE to which the resource for SR is not assigned, LTE may also support a contention-based SR method, i.e., a random access method.

Figure 5:
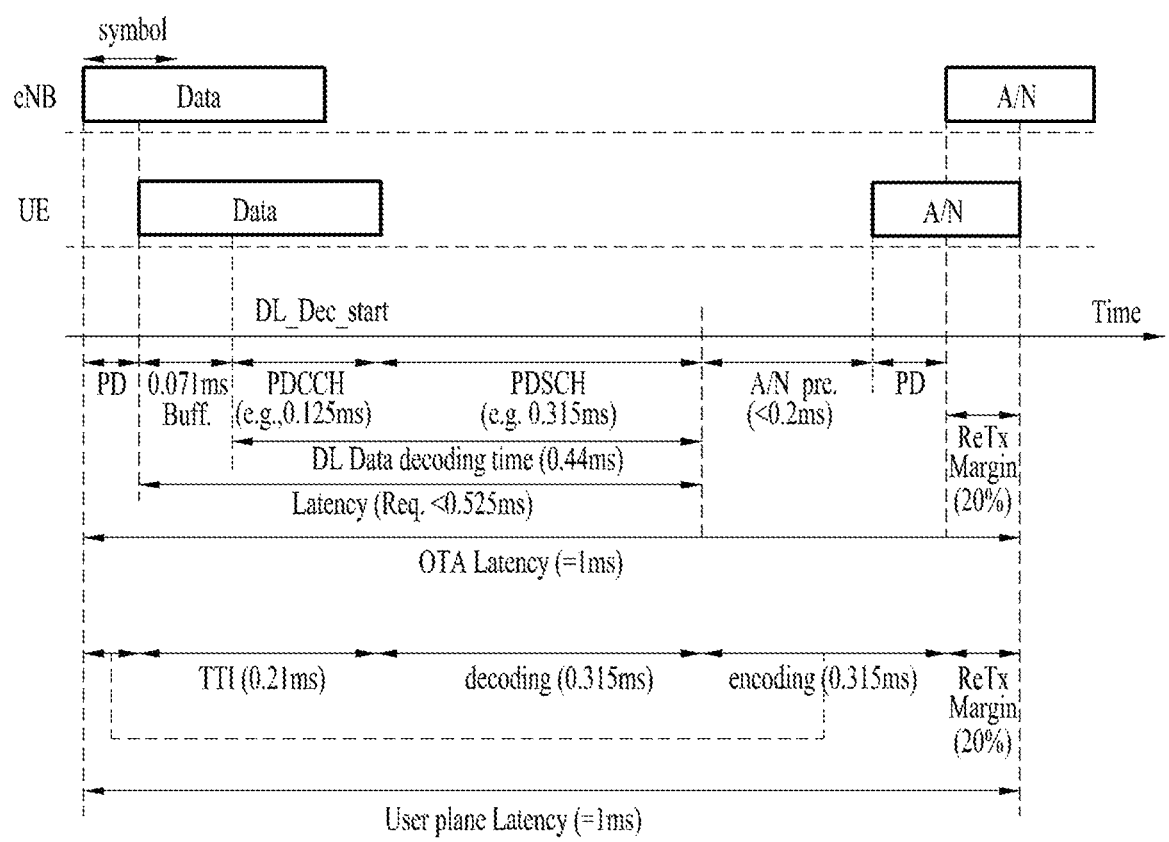
FIG. 5 is a diagram showing reduction in a TTI length according to reduction in user plane latency.

To satisfy the aforementioned reduction in latency, i.e., low latency, it may be required to reduce TTI that is a minimum unit of data transmission to newly design a shortened TTI (sTTI) of 0.5 msec or less. For example, as illustrated in FIG. 5, to shorten user plane (U-plane) latency to a time point when a UE completely transmits ACK/NACK (A/N) from a time point when an eNB begins to transmit data (PDCCH and PDSCH) to 1 msec, a sTTI may be configured in units of about 3 OFDM symbols.

Figure 6:
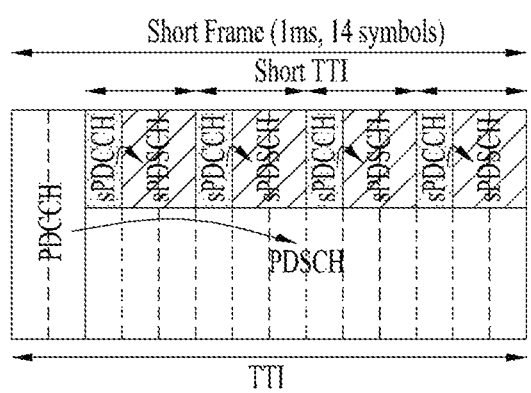
FIG. 6 is a diagram showing an example in which a plurality of short TTIs is set in one subframe.

In a DL environment, a PDCCH (i.e., sPDCCH) for data transmission/scheduling in such a sTTI and a PDSCH (i.e., sPDSCH) for transmission in the sTTI may be transmitted and, for example, as illustrated in FIG. 6, a plurality of sTTIs may be configured using different OFDM symbols in one subframe. Particularly, OFDM symbols included in the sTTI may be configured by excluding OFDM symbols transmitted by legacy control channels. The sPDCCH and the sPDSCH may be transmitted in the sTTI in the form of time division multiplexing (TDM) using different OFDM symbol regions and may be transmitted in the form of frequency division multiplexing (FDM) using different PRB domain/frequency resources.

In the specification, the present invention is described below in terms of an LTE/LTE-A system. In an existing LTE/LTE-A, when having a normal CP, a subframe of 1 ms may include 14 OFDM symbols and, when a symbol is configured with a TTI in a shorter unit than 1 ms, a plurality of TTIs may be configured in one subframe. A method of configuring a plurality of TTIs may configure two symbols, three symbols, four symbols, and seven symbols as one TTI, as in an embodiment shown in FIG. 7 below. Although not shown, the case in which one symbol is configured as a TTI may also be configured. When one symbol is one TTI unit, 12 TTIs may be generated on the assumption that a legacy PDCCH is transmitted in two OFDM symbols. Similarly, as shown in FIG. 7A, when two symbols correspond to one TTI unit, 6 TTIs may be generated, as shown in FIG. 7B, when three symbols correspond to one TTI unit, 4 TTIs may be generated and, as shown in FIG. 7C, when four symbols correspond to one TTI unit, 3 TTIs may be generated. Needless to say, in this case, first two OFDM symbols may be assumed to transmit a legacy PDCCH.

As shown in FIG. 7D, when seven symbols are configured with one TTI, one TTI of seven symbol units including a legacy PDCCH and seven subsequent symbols may be configured as one TTI. In this case, in the case of a UE that supports a sTTI, when one TTI includes seven symbols, it may be assumed that puncture or rate-matching is performed on two OFDM symbols positioned at a fore end for transmitting a legacy PDCCH with respect to a TTI (first symbol) positioned at a fore end of one subframe and it may be assumed that corresponding data and/or control information are transmitted in five symbols. On the other hand, it may be assumed that a UE is capable of transmitting data and/or control information all seven symbols without a punctured or rate-matched resource region with respect to a TTI (second slot) positioned at a rear end of one subframe.

Figure 8:
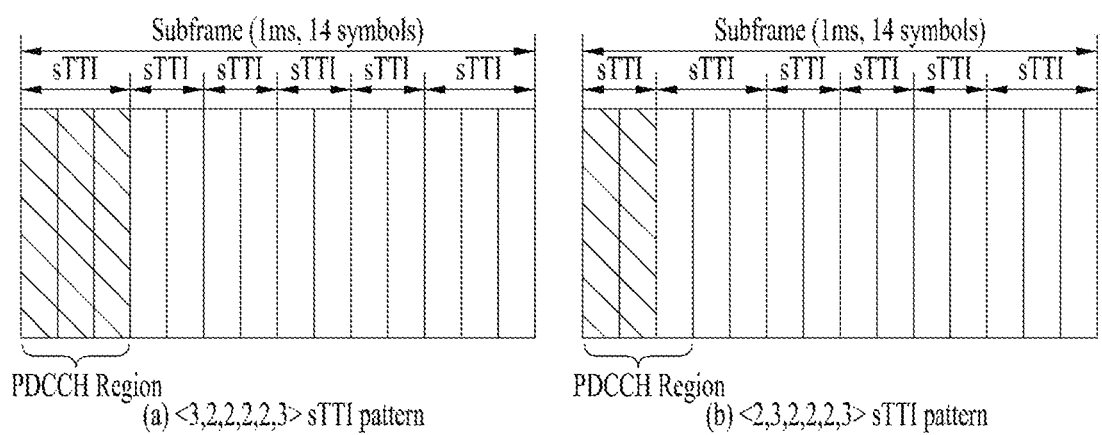
FIG. 8 is a diagram showing a DL subframe structure including a short TTI including two or three symbols.

According to the present invention, a sTTI including two OFDM symbols (hereinafter, "OS") and a sTTI including three OSs may be considered to include sTTI structures that are combined and present in one subframe, as shown in FIG. 8. The sTTI including 2-OS or 3-OS sTTIs may be simply defined as 2-symbol sTTI (i.e., 2-OS sTTI). Also, 2-symbol sTTI or 3-symbol sTTI may be simply referred to as 2-symbol TTI or 3-symbol TTI, respectively, and it is clear that these are TTIs shorter than the 1 ms TTI, which is the legacy TTI, which is the premise of the present invention. That is, in the specification, the term "TTI" is referred to instead of sTTI, the term TTI means the sTTI, and regardless of its name, what the present invention proposes is a communication scheme in a system composed of TTIs shorter than a legacy TTI.

Also, in this specification, numerology refers to defining a length of a TTI to be applied to the wireless communication system, a subcarrier interval and the like, or a parameter or a communication structure or system based on the parameter such as the defined length of the TTI or sub-carrier spacing.

As shown in FIG. 8A, a sPDCCH may also be transmitted depending on the number of symbols of a PDCCH in a <3,2,2,2,2,3> sTTI pattern. In a <2,3,2,2,2,3> sTTI pattern of FIG. 8B, it may be difficult to transmit an sPDCCH due to a legacy PDCCH region.

Scheduling Request (SR) for Reduction in Latency

A time interval of an SR resource for satisfying specific requirement (e.g., ultra-reliable and/or low latency) may be configured to be smaller than a scheduling basic unit used in general data traffic (e.g., enhanced mobile broadband (eMBB)). For example, an SR resource for existing general eMBB traffic may be configured in a slot unit and, separately therefrom, an SR resource for separate URLLC traffic may be configured in a mini-slot unit. As another example, an SR resource for 1 ms TTI data traffic may be configured in a unit of 1, 2, 5, 10, 20, 40, or 80 ms and, on the other hand, an SR resource for sTTI data traffic (e.g., 2/3-symbol sTTI) may be configured in a shorter time interval unit (e.g., 1 sTTI or X sTTIs) than in the former case.

A rule may be defined to trigger each SR with respect to different services and/or latency requirements. For example, a rule may be defined to transmit URLLC SR separately from eMBB SR by a UE. In this case, particularly, a rule may be defined to transmit SR for different traffics even when UL grant for specific traffic is received.

SR for a specific service and/or latency requirement may be transmitted via physical layer signaling to further reduce latency rather than being transmitted to a MAC PDU. Particularly, corresponding SR may also be transmitted to (s)PUCCH (along with HARQ-ACK) (similarly to existing LTE). Alternatively, SR may be piggybacked to (s)PUSCH together and, in this case, the corresponding SR may puncture a UL-SCH region and may be mapped thereto or may be rate-matched and mapped to a UL-SCH region. In this case, particularly, a rule may be defined to transmit SR for a specific service and/or latency requirement in grant-free based PUSCH. This may be applied to a situation for switching to grant-based UL transmission from grant-free based UL transmission.

When a plurality of SRs for different specific services and/or latency needs to be transmitted at the same time, the following methods are proposed.

Alt 1: A plurality of SRs may be transmitted through different time resources (i.e., TDM). Particularly, SR for traffic with tight latency among a plurality of SRs may have as high priority as possible and may be preferentially transmitted.

Alt 2: Respective SRs may be simultaneously transmitted through separate physical channels.

Alt 3: A plurality of SRs may be simultaneously transmitted through one physical channel.

In this case, SRs may be re-classified in one physical channel. For example, when simultaneously transmitted to (s)PUCCH, eMBB SR and URLLC SR may be classified into positive/positive, positive/negative, and negative/positive SRs and negative/negative may be processed as non-transmission.

Alternatively, SR bundling may be considered for a plurality of SRs. For example, when even one of a plurality of SRs is positive SR, transmitted SR may be positive SR and a rule may be defined to perform UL grant scheduling on a plurality of traffic by an eNB during SR detection.

Alt 4: Priority may be determined with respect to a plurality of SRs and a rule may be defined to transmit only some of the SRs and to drop the other SRs. For example, when transmission timings of eMBB SR and URLLC SR overlap with each other, a rule may be defined to assign as high priority as possible to URLLC SR, to transmit the URLLC SR, and to drop the eMBB SR.

In a situation in which a DL/UL resource is flexibly changed like dynamic TDD, a rule may be defined to whether SR in a DL resource is transmitted according to priority that is predefined or is configured via a high layer signal (or physical layer signal). Particularly, when SR of a DL channel and SR of specific service/traffic overlap with each other in a specific DL resource, priority may be determined in order of DL URLLC>URLLC SR>DL eMBB>eMBB SR. Alternatively, priority may be determined in order of DL URLLC>DL eMBB>URLLC SR>eMBB SR in such a way that DL traffic has high priority in a DL resource.

A short duration PUCCH may be assigned to last 1 symbol or 2 symbols of a slot and, in this regard, SR for specific service/traffic (e.g., URLLC SR) needs to be more frequently transmitted. Particularly, a rule may be defined to exceptionally assign a short duration PUCCH even to a front and/or intermediate portion of a slot in the case of SR for specific service/traffic (e.g., URLLC SR). More generally, a time resource for URLLC SR and URLLC HARQ-ACK may be reserved in all min-slots in an eMBB scheduling unit (e.g., slot).

When SR transmission for specific service/traffic (e.g., URLLC SR) overlaps with other UL channels on time, a dedicated frequency domain may be assigned for an SR resource for URLLC more simply. In more detail, when SR resources of eMBB PUSCH/PUCCH and URLLC collide with each other in terms of the same UE, a rule may be defined to piggyback SR to an eMBB PUSCH, to drop PUSCH/PUCCH and to transmit only URLLC SR, to drop SR and to transmit PUSCH/PUCCH, or to puncture or rate-matching only an eMBB PUSCH/PUCCH portion corresponding to an SR resource and to transmit SR. In this case, it may not be required to perform the puncturing or the rate-matching on all SR resource and a rule may be defined to perform the puncturing or the rate matching only at a time point of actually transmitting URLLC SR. When SR resources of eMBB PUSCH/PUCCH and URLLC overlap with each other in terms of different UEs, puncturing or rate matching may be always required. Accordingly, a rule may be defined in such a way that an eNB may notify a UE about a plurality of SR time/frequency/(spatial) resource information items through a high/physical layer signal and the UE performs puncturing or rate-matching only on a portion that overlaps with PUSCH or PUCCH.

Particularly, a UE behavior may be determined in different way or in the same way according to an eMBB PUCCH duration that collides with an SR resource. When long PUCCH and URLLC SR collide with each other, a rule may be defined to piggyback SR to an eMBB PUCCH$^{0-}$∥ SR, to drop the long PUCCH and to transmit only URLLC SR, or to drop SR and transmit the long PUCCH, or to simultaneously transmit SR and the long PUCCH. When a short PUCCH and URLLC SR collides with each other, a rule may be defined in such a way that the UE transmits a PUCCH resource via joint coding, transmits a PUCCH resource, determines and transmits a last resource via a combination of a PUCCH resource and an SR resource, or simultaneously transmits the PUCCH resource and the SR resource. Alternatively, 1 bit may be added to PUCCH and UCI of PUCCH and SR may be transmitted to a third resource determined via a combination of a PUCCH resource and an SR resource (or pre-configured through a high/physical layer signal). Alternatively, a plurality of resources may be configured through a high/physical layer signal and a last transmission resource may also be determined depending on a state of SR and UCI of PUCCH via channel selection.

Simultaneous transmission configuration of the long PUCCH and URLLC SR and/or the short PUCCH and URLLC SR, or simply, simultaneous transmission configuration of PUCCH and URLLC SR or simultaneous transmission configuration of PUSCH and SR may be configured UE-specifically, or may be configured to a UE for each predetermined or pre-configured cell group, for each cell, or for each band/band combination.

A rule may be defined to report simultaneous transmission capability (or, simply, simultaneous transmission capability of PUCCH and URLLC SR or simultaneous transmission capability of PUSCH and SR) of a long PUCCH and URLLC SR and/or a short PUCCH and URLLC SR to a network UE-specifically, or for each predetermined or pre-configured cell group, for each cell, or for each band/band combination.

To reduce latency, during reception of SR, a network may issue UL grant as early as possible. As one method, UL grant may be issued using a pre-configured resource and/or a transport block size (TBS). The pre-configured resource may be a resource configured as a grant-free resource or a portion thereof. The TBS may also be one of a plurality of values pre-configured for grant-free use. That is, resource/TBS used by a UE among grant-free resources may be indicated to the UE via UL grant. This determination may be rapidly performed and, thus, a network or an eNB may issue UL grant as soon as the network or the eNB receives SR. In this case, the UE predicts a resource and the TBS to some degrees after SR transmission and pre-forms PUSCH and, thus, a UL grant-to-PUSCH transmission timing may be predefined or may be automatically determined as a shorter value than a value indicated through a high layer signal/physical layer signal. Alternatively, as described above, when UL grant is issued using a pre-configured resource and/or a TBS, the transmission timing may be configured/indicated as a shorter value than a default value through a high layer/physical layer signal. For example, when UL grant is issued using a pre-configured resource and/or TBS, a rule may be defined in such a way that a UE transmits PUSCH in a first available grant-free resource.

Buffer State Report (BSR) for Latency Reduction

A rule may be defined to report each buffer state report (BSR) with respect to different services and/or latency requirements. Particularly, a rule may be defined in such a way that respective BSRs indicate ranges of different values with respect to different services and/or latency requirements. In detail, a rule may be defined in such a way that the same state of BSR of an eMBB and BSR of URLLC indicates different values/ranges/granularities. Independently different separate tables may be newly defined for BSR report of URLLC and a rule may be defined in such a way that a specific state of URLLC BSR indicates a new value obtained by adjusting specific states via offset of an existing defined table. A rule may be defined in such a way that all BSRs or specific BSRs are reported to include information on latency and/or reliability for corresponding traffic together and a network may perform more appropriate scheduling to requirements of the UE based on the rule. For example, when the UE includes information indicating that a block error ratio (BLER) is transmitted in $10^{-5}$ or less in x ms with respect to specific URLLC traffic in BSR and reports the information and a network may perform corresponding UL scheduling based on the report.

Simultaneous Transmission of SR, BSR, and/or HARQ-ACK

To more rapidly transmit UL data, a multiple-level SR method of configuring a plurality of resources and mapping a specific resource and a BSR state may be possible as one method of transmitting BSR together with SR. As another method, a rule may be defined to transmit SR in a symbol that is modulated via quadrature phase shift keying (QPSK) or, more generally, is modulated and to map each modulated symbol and the BSR state. The above methods may be applied in a similar way to the case in which other information items other than BSR are transmitted during transmission of SR.

When HARQ-ACK with respect to a specific DL data channel is also transmitted together during transmission of SR+BSR, a UE may transmit as all information items as possible. Accordingly, as described above, a method of transmitting UCI of a UE when timings of HARQ-ACK with respect to a specific DL data channel overlap with each other during transmission of BSR (or other information other than BSR) along with SR is proposed as follows.

Alt 1: A rule may be defined to drop BSR and to map a state of SR and HARQ-ACK to QPSK or, more generally, each modulated symbol. For example, each state of QPSK may include {positive SR, ACK}, {positive SR, NACK}, {negative SR, ACK}, and {negative SR, NACK}. Particularly, the mapping may be replaced with {positive SR, BSR state 1}, {positive SR, B SR state 2}, {negative SR, B SR state 3}, and {negative SR, BSR state 4} when DL assignment DCI is missed or DL scheduling is not present with respect to a DL data channel, that is, in the case of DTX.

Alt 2: A rule may be defined to perform an operation such as HARQ-ACK bundling and/or BSR sub-sampling and, then, to map a state configured with a combination of SR and {bundled HARQ-ACK and/or sub-sampled BSR} to QPSK or, more generally, each modulated symbol.

Alt 3: A rule may be defined to map a specific resource to a BSR state and to map each modulated symbol in a corresponding resource to a HARQ-ACK state. For example, PUCCH resources 1, 2, 3, and 4 may be pre-configured to a UE via a high layer signal and may be mapped to BSR states 1, 2, 3, and 4, respectively. The respective states of QPSK may be mapped to {positive SR, ACK}, {positive SR, NACK/DTX}, {negative SR, ACK}, and {negative SR, NACK/DTX}.

Alternatively, on the other hand, a rule may be defined to map a specific resource to a HARQ-ACK state and to map each modulated symbol in a corresponding resource to a BSR state. For example, in this case, PUCCH resources 1 and 2 may be pre-configured to the UE via a high layer signal and may be mapped to ACK and NACK/DTX, respectively. The respective states of QPSK may be mapped to {positive SR, BSR state 1}, {negative SR, BSR state 2}, {negative SR, BSR state 3}, and {negative SR, BSR state 4}.

Alt 4: A rule may be defined to map a specific resource to a BSR state and to map cyclic shift (CS) (or a scrambling identifier) of a sequence transmitted in a corresponding resource to HARQ-ACK state. Alternatively, on the other hand, a rule may be defined to map a specific resource to a HARQ-ACK state and to map CS (or a scrambling identifier) of a sequence transmitted in a corresponding resource to a BSR state.

Alt 5: A rule may be defined to discard some states of BSR and to transmit SR+BSR including negative SR. For example, a rule may be defined to represent {positive SR+BSR state 1}, {positive SR+BSR state 2}, {positive SR+BSR state 3}, and {negative SR} with 2 bits. As another example, a rule may be defined to further use a bit without discarding a state of BSR and to transmit SR+BSR. For example, a rule may be defined to represent {positive SR+BSR state 1}, {positive SR+BSR state 2}, {positive SR+BSR state 3}, {positive SR+BSR state 4}, and {negative SR} with 3 bits.

Alt 6: When HARQ-ACK is transmitted together with respect to a specific DL data channel during transmission of SR+BSR, all information items may be transmitted without loss of information. Accordingly, in the above case, a rule may be defined to transmit all of SR, BSR, and HARQ-ACK by changing a PUCCH format. In this case, whether a PUCCH format is modified may be determined according to a payload size of HARQ-ACK. In addition, a rule may be defined to determine one of a plurality of predefined/predetermined PUCCH formats according to a payload size of HARQ-ACK and to transmit SR, BSR, and HARQ-ACK. For example, a rule may also be defined to use PUCCH format 1a/1b (or PUCCH for a small payload, which is newly defined in a new RAT (NR)) during transmission of SR+BSR, to use PUCCH format 3 when HARQ-ACK with X bits (e.g., X=22) or less is transmitted together, and to use PUCCH format 4 (or PUCCH for a large payload, which is newly defined in an NR) when HARQ-ACK with a greater bits than X bits is transmitted together.

Alt 7: Alternatively, a rule may be defined to increase a resource block (RB) of PUCCH and to transmit SR, BSR, and/or HARQ-ACK in a multiple-RB PUCCH when HARQ-ACK is also transmitted together with respect to a specific DL data channel during transmission of SR+BSR. A rule may be defined to determine the number of RBs in consideration of an information amount/payload to be transmitted or to transmit SR, BSR, and/or HARQ-ACK using the number of RBs, which is configured via a high layer signal/physical layer signal. For example, a rule may be defined to transmit 1 RB when HARQ-ACK with X bits (e.g., X=22) or less is transmitted together and to transmit the number of RBs, which is configured via a predetermined number of RBs or a high layer signal (or indicated by DCI) when HARQ-ACK with greater bits than X bits is transmitted together.

Alt 8: As another method, SR, BSR, and HARQ-ACK may be delivered in a plurality of PUCCH (formats) according to a predefined rule and a corresponding plurality of PUCCH (formats) may be TDM, FDM, and/or CDM and may be entirely transmitted. For example, SR+BSR may be mapped to one PUCCH and transmitted and HARQ-ACK may be mapped to another one PUCCH and transmitted.

Collision Process of SR and HARQ-ACK

When transmission timings of a plurality of HARQ-ACK and SR with different TTI lengths (and/or numerology), service/latency requirement, and/or processing time) overlap with each other, collision process may be required. In detail, there may be the following cases.

Case 1: Longer TTI HARQ-ACK+longer TTI SR+shorter TTI SR

Case 2: Longer TTI HARQ-ACK+shorter TTI HARQ-ACK+longer TTI SR

Case 3: Longer TTI HARQ-ACK+shorter TTI HARQ-ACK+shorter TTI SR

Case 4: Longer TTI HARQ-ACK+shorter TTI HARQ-ACK+longer TTI SR+shorter TTI SR

Case 5: shorter TTI HARQ-ACK+longer TTI SR+shorter TTI SR

When the above collision case occurs, a method of transmitting UCI in a shorter TTI PUCCH may be considered. Particularly, when the number of SRs is single (e.g., Case 2 or 3), a rule may be defined to transmit longer TTI HARQ-ACK and/or shorter TTI HARQ-ACK to SR positive using (s)PUCCH in the case of the positive SR and to transmit longer TTI HARQ-ACK and/or shorter TTI HARQ-ACK in a shorter TTI HARQ-ACK resource using (s)PUCCH in the case of the negative SR. In this case, a separate resource may be configured depending on a TTI length of SR (numerology, service/latency requirement, and/or processing time), in Case 2, (s)PUCCH including positive longer TTI SR is transmitted to a PUCCH resource configured for longer TTI SR, and in Case 3, (s)PUCCH including positive shorter TTI SR is transmitted to a PUCCH resource configured for shorter TTI SR.

On the other hand, when the number of SRs is a plural number (e.g., Case 1, 4, or 5), a rule may be defined to drop SR with low priority and to transmit only SR with as high priority as possible. For example, a rule may be defined to drop longer TTI SR and transmit loner and/or shorter TTI HARQ-ACK and only shorter TTI SR to assign as high priority as possible to low latency traffic. In this case, a rule may be defined to transmit longer TTI HARQ-ACK and/or shorter TTI HARQ-ACK to a shorter TTI SR resource using (s)PUCCH in the case of positive shorter TTI SR and to transmit longer TTI HARQ-ACK and/or shorter TTI HARQ-ACK to a shorter TTI HARQ-ACK resource using (s)PUCCH in the case of negative SR. That is, the same method as in the case in which the number of SRs is single may be used. Particularly, when SR of a specific TTI (numerology, service/latency requirement, and/or processing time) is dropped, BSR may also include request information on corresponding scheduling.

As another method, a rule may be defined to transmit both longer TTI SR and shorter TTI SR without separate drop. To this end, an additional resource may be pre-configured and a UE may transmit all plural SRs according to a predetermined rule. As a specific example, three resources for use of SR transmission may be configured and, in the case of (negative longer TTI SR and negative shorter TTI SR), a rule may be defined to transmit (s)PUCCH to a shorter TTI HARQ-ACK resource, to correspond cases of (positive longer TTI SR, negative shorter TTI SR), (negative longer TTI SR, positive shorter TTI SR), and (positive longer TTI SR, positive shorter TTI SR) to the other three resources, respectively, and to transmit (s)PUCCH.

As another method, a rule may be defined to differentiate states of SR of a specific TTI (numerology, service/latency requirement, and/or processing time) depending on whether an SR resource and a HARQ-ACK resource are transmitted and to differentiate states of SR of the other TTIs (numerology, service/latency requirement, and/or processing time) depending on CS of a (s)PUCCH sequence.

As another method, a rule may be defined to preferentially trigger SR with the same TTI as a TTI length of HARQ-ACK when the number of SRs is a plural number (e.g., Case 1 or 5) and to drop SR with different TTIs.

Multiple-Bit SR Transmission

A next-generation system has considered a method of largely reducing transmission latency depending on an application field. In particular, introduction of grant-free UL transmission in which UL transmission is started according to determination of a UE has been considered instead of conventional scheduling based on UL grant with respect to UL transmission. In more detail, an eNB may configure a resource configured for grant-free UL transmission and may indicate the configuration to a UE and the UE may begin UL transmission without UL grant. For convenience of description, this transmission is referred to as "grant-free UL transmission".

In the case of "grant-free UL transmission", to prevent ambiguity about whether an eNB makes a request for retransmission of later coupling or transmission in the case of the "grant-free UL transmission", a type of identifier such as a HARQ process number needs to be defined. As a method of transmitting the identifier together with SR, the following multiple-bit SR may be considered.

Alt 1: A rule may be defined to associate or link states represented by a plurality of bits with a HARQ process number. In this case, an SR bit number for representing the state may be determined depending to a total number of HARQ process numbers.

Alt 2: A rule may be defined to represent a HARQ process number via a combination of a plurality of bits and a plurality of SR resources.

An original objective of SR may be to make a request for transmission of UL grant for receiving scheduling of UL traffic to be transmitted by a UE when the UL traffic is generated. Other than this objective, a signal for making a request for configuration of a resource for grant-free UL transmission may be introduced/transmitted.

Alternatively, a signal for a request for making a request for new data on DL may be introduced/transmitted. The signal may be required when an eNB issues retransmission grant due to ACK-to-NACK error even if a UE transmits ACK. Particularly, a rule may be defined to transmit the "signal for a request for making a request for new data on DL" when retransmission is not scheduled during a time period that is predefined/predetermined, is configured through a high layer signal, or indicated through DCI from a time point of receiving DCI for scheduling a specific PDSCH, a time point of receiving a specific PDSCH, or a time point of transmitting ACK thereto.

Alternatively, a signal for a request for making a request for retransmission of DL may be introduced/transmitted. On the other hand, the signal may be required when an eNB issues grant for scheduling new data due to NACK-to-ACK error even if a UE transmits NACK. Particularly, a rule may be defined to transmit the "signal for a request for making a request for DL retransmission" when retransmission is not scheduled during a time period that is predefined/predetermined, is configured through a high layer signal, or indicated through DCI from a time point of receiving DCI for scheduling a specific PDSCH, a time point of receiving a specific PDSCH, or a time point of transmitting ACK thereto.

A rule may be defined to configure a separate resource for the "request for making a request for new data on DL" and/or the "request for making a request for DL retransmission" from the "request for making a request for UL grant" and/or "request for making a request for configuration of a resource for grant-free UL transmission". As such, an eNB may determine whether the request is made in DL or UL.

A type of identifier (e.g., HARQ process number) indicating PDSCH related to the "request for making a request for new data on DL" and/or the "request for making a request for DL retransmission" may be included together in the signal for the request and may be transmitted.

More particularly, the above requests of the UE for various objectives may be represented using multiple-bit SR. For example, whether the request is a UL grant request or a resource request for "grant-free UL transmission" may be represented using multiple-bit SR or whether the request is a request made via a specific combination of a UL grant request, a resource request for grant-free UL transmission, a DL new data request, and a DL retransmission request. Alternatively, a more detailed request about whether a larger resource or a smaller resource than a resource that is pre-configured along with the "request for grant-free UL transmission" is required may also be represented through multiple-bit SR. The request may be defined by a separate signal but not the multiple-bit SR.

As another method, a rule may be defined to include a type of identifier (e.g., HARQ process number) about PDSCH in NACK of specific PDSCH and to transmit the NACK of the specific PDSCH when the UE transmits the NACK of the specific PDSCH. This may be required for a UE to make a request for retransmission of PDSCH that is not appropriately decoded when an eNB schedules new PDSCH even if NACK of a specific PDSCH is transmitted. Particularly, a rule may be defined to transmit the NACK+ HARQ process number when retransmission is not scheduled during a time period that is predefined/predetermined, is configured through a high layer signal, or indicated through DCI from a time point of receiving DCI for scheduling a specific PDSCH, a time point of receiving a specific PDSCH, or a time point of transmitting NACK thereto.

Handling Collision Between SR And Other Channel/Signal

A next-generation system has considered a UL control channel with various lengths of TTIs and, accordingly, has also considered a method of transmitting SR. When transmission timings of SR transmitted by an x-symbol PUCCH and HARQ-ACK transmitted by a y-symbol PUCCH overlap with each other, a detailed method of transmitting corresponding SR and HARQ-ACK is proposed Case 1: x<y Option 1-1: SR information may be included in a part of PUCCH for transmitting HARQ-ACK and, in detail, when HARQ-ACK is transmitted in the form of sequence-based PUCCH, a sequence may be repeated in each symbol and, thus, PUCCH including SR information may also be transmitted by additionally using a resource (e.g., cyclic shift and/or physical-domain resource) of a sequence to be transmitted to a corresponding time resource only at a time point (e.g., a resource corresponding to a symbol of a time axis) corresponding to a transmission timing of the SR. Alternatively, PUCCH including SR may also be transmitted by additionally using a resource (e.g., cyclic shift and/or physical-domain resource) of a sequence at a time point that is predefined/predetermined or signaled or up to an ending symbol of PUCCH after a time point corresponding to a transmission timing of the SR. In this case, a PUCCH format and/or TTI length for actually transmitting HARQ-ACK and SR may be modified according to a HARQ-ACK payload size, an entire payload size of the sum of HARQ-ACK and SR, a TTI length/numerology of HARQ-ACK PUCCH, and/or a format of HARQ-ACK PUCCH, etc.

Option 1-2: SR information may be entirely included in PUCCH for transmitting HARQ-ACK and, in detail, when HARQ-ACK is transmitted in the form of sequence-based PUCCH, a sequence may be repeated in each symbol and, thus, PUCCH including SR information may also be transmitted by additionally using a resource (e.g., cyclic shift and/or physical-domain resource) of a sequence to be transmitted to each symbol. In this case, a PUCCH format and/or TTI length for actually transmitting HARQ-ACK and SR may be modified according to a HARQ-ACK payload size, an entire payload size of the sum of HARQ-ACK and SR, a TTI length/numerology of HARQ-ACK PUCCH, and/or a format of HARQ-ACK PUCCH, etc.

Option 1-3: A rule may be defined to puncture or rate-match PUCCH for transmitting HARQ-ACK through SR and to transmit the PUCCH. Particularly, in this case, a time resource in PUCCH punctured or rate-matched may be limited only in duration corresponding to an original transmission timing of SR. Alternatively, a time resource in PUCCH punctured or rate-matched may be limited only in an ending symbol of PUCCH, in predefined/predetermined duration, or duration that is configured/indicated through a high layer/physical signal after an original transmission timing of the SR.

Option 1-4: A rule may be defined to delay SR transmission to a next transmission time point that is determined by a predetermined (or signaled) period and offset. Alternatively, a rule may be defined to preferentially transmit SR in the earliest UL transmissible slot/mini-slot or the like after an original SR transmission timing.

Option 1-5: A rule may be defined to simultaneously transmit two PUCCHs for transmitting HARQ-ACK and SR. Particularly, the simultaneous transmission may be allowed only when UE capability and/or network configuration are present with respect to simultaneous transmission of a plurality of UL channels corresponding to different TTI lengths and/or numerologies. Particularly, the simultaneous transmission may be allowed only when a UL waveform of two channels that are configured by a high layer signal or indicated by a physical layer signal is cyclic-prefix orthogonal frequency division multiplexing (CP-OFDM). When one of the two channels is SC-FDMA, the UE capability and/or network configuration may be ignored and one PUCCH may be dropped. When transmission timings of SR-PUCCH and HARQ-ACK-PUCCH overlap with each other, generally, SR may be dropped and only HARQ-ACK PUCCH may be transmitted but, when there is a scheduling request for URLLC traffic or low latency in consideration of a service type and/or latency requirement of SR, HARQ-ACK PUCCH may be dropped and only PUCCH for transmitting SR may be transmitted. The present option may be applied to the case of x>y in the same way.

Case 2: x>y

Option 2-1: HARQ-ACK information may be included in a portion of PUCCH for transmitting SR. In detail, when SR is transmitted in the form of sequence-based PUCCH, a sequence may be repeated in each symbol and, thus, PUCCH including HARQ-ACK information may be transmitted by additionally using a resource (e.g., cyclic shift and/or physical-domain resource) of a sequence to be transmitted to a corresponding time resource only at a time point (e.g., a resource corresponding to a symbol of a time axis) corresponding to a transmission timing of HARQ-ACK. Alternatively, PUCCH including HARQ-ACK information may be transmitted by additionally using a resource (e.g., cyclic shift and/or physical-domain resource) of a sequence at a time point that is predefined/predetermined or signaled or up to an ending symbol of PUCCH after a time point corresponding to a transmission timing of the HARQ-ACK. In this case, a PUCCH format and/or TTI length for actually transmitting HARQ-ACK and SR may be modified according to a HARQ-ACK payload size, an entire payload size of the sum of HARQ-ACK and SR, a TTI length/numerology of SR PUCCH, and/or a format of SR PUCCH, etc.

Option 2-2: HARQ-ACK information may be transmitted in entire PUCCH for transmitting SR. In this case, HARQ-ACK information may be transmitted with SR to one PUCCH channel through format adaptation in consideration of a HARQ-ACK payload size, an entire payload size of the sum of HARQ-ACK and SR, a TTI length/numerology of SR PUCCH, and/or a format of SR PUCCH, etc.

Option 2-3: A rule may be defined to puncture or rate-match PUCCH for transmitting SR through HARQ-ACK. Particularly, in this case, a time resource in PUCCH punctured or rate-matched may be limited only in duration corresponding to an original transmission timing of HARQ-ACK. Alternatively, a time resource in PUCCH punctured or rate-matched may be limited only in an ending symbol of PUCCH, in predefined/predetermined duration, or duration that is configured/indicated through a high layer/physical signal after an original transmission timing of the HARQ-ACK.

Option 2-4: A rule may be defined to preferentially transmit HARQ-ACK in the earliest UL transmissible slot/mini-slot or the like after an original HARQ-ACK transmission timing.

Option 2-5: When the overlapped time does not correspond to a timing of an SR resource of a y-symbol PUCCH (i.e., when the y-symbol PUCCH does not include a valid SR resource at the corresponding overlapped time), the SR may not be transmitted (the x-symbol PUCCH itself may be dropped). A rule may be defined to delay SR transmission to a next transmission time that is determined by a predetermined (or signaled) period and offset. Alternatively, SR may not be transmitted (the x-symbol PUCCH itself may be dropped) and a rule may be defined to transmit the SR in the earliest valid resource for SR transmission resource after an original SR transmission timing.

In other words, when a y-symbol PUCCH includes a valid SR resource at the overlapped time, the SR that was supposed to be transmitted in the x-symbol PUCCH may be transmitted in the y-symbol PUCCH and, otherwise, transmission of the SR may be dropped.

When transmission timings of SR and SRS that are transmitted by the x-symbol PUCCH overlap with each other, a detailed method of transmitting corresponding SR and SRS is proposed.

Option 1: A rule may be defined to drop SRS and to transmit SR. In this case, a rule may be defined to apply SRS drop only when a TTI length of the SRS is less than a predetermined value. When the TTI length of the SRS is equal to or greater than a predetermined length, a rule may be defined to drop the SR and to puncture SRS transmission and to transmit the SR only in SR transmission duration.

Option 2: A rule may be defined to drop SRS when the TTI length of SR transmission PUCCH is less than a predetermined value and to puncture SR transmission and to transmit SRS when the TTI length is equal to or greater than a predetermined value.

Option 3: A rule may be defined to simultaneously transmit SRS and SR. Particularly, the simultaneous transmission may be allowed only when UE capability and/or network configuration are present with respect to simultaneous transmission of SRS and SR corresponding to different TTI lengths and/or numerologies. Particularly, the simultaneous transmission may be allowed only when a UL waveform of SRS and SR PUCCH that are configured by a high layer signal or indicated by a physical layer signal is CP-OFDM. When one of the SRS and the SR PUCCH is SC-FDMA, the UE capability and/or network configuration may be ignored and one PUCCH may be dropped. When transmission timings of SR-PUCCH and SRS overlap with each other, generally, SRS may be dropped and only SR PUCCH may be transmitted but, when priority of SRS is configured/defined to be higher than SR (due to use of beam management), the SR may be dropped and the SRS may be transmitted.

Resource Configuration for Transmission of Only Positive SR

The following agreements are determined.
One of four sPUCCH resources configured by a high layer may be indicated by a 2-bit filed for at least sPUCCH formats below.
2/3-OS sPUCCH format(s) carrying ACK/NACK+SR which is greater than 2 bits
2/3-OS sPUCCH format(s) carrying 2-bit ACK/NACK, one of four sPUCCH resource groups configured by a high layer may be indicated by a 2-bit field of sDCI1. Each group may include two to four sPUCCH resources (which depend upon a predicted number of HARQ-ACK bits) configured via a high layer.
7-OS sPUCCH format(s) carrying ACK/NACK+SR which is greater than 2 bits
7-OS sPUCCH format(s) carrying up to 2-bit ACK/NACK.
Two sPUCCH resources may be configured for SR and 1-bit HARQ-ACK.
When positive SR and 1-bit HARQ-ACK need to be transmitted on 2/3-symbol sPUCCH in the same sTTI, one resource may be used for SR+ACK and other resource may be used for SR+NACK.
When 1/2-bit HARQ-ACK needs to be transmitted on 2/3-OS sPUCCH and needs to be transmitted on 2/3-symbol sPUCCH in the same sTTI, HARQ-ACK may be transmitted on an sPUCCH resource for HARQ-ACK.

As such, when a UE configured with an sTTI needs to transmit 1/2-bit HARQ-ACK or 1/2-bit HARQ-ACK+positive SR to 2/3-OFDM symbol (OS) sPUCCH, a pre-configured sPUCCH resource in one group indicated by an ACK/NACK resource indicator (ARI) may be used in four resource groups. When there is no PDSCH scheduling and only positive SR needs to be transmitted without a HARQ-ACK bit corresponding to PDSCH scheduling, there is no ARI and, thus, there is a need for a method of determining whether a corresponding positive SR is transmitted using a resource.

As one method, a separate sPUCCH resource for SR needs to be configured like existing LTE and, in this regard, a resource for sPUCCH transmission may be excessively reserved. As a method for alleviating this, a rule may be defined to use a specific resource of one predetermined (configured through a high layer or indicated through a physical layer signal) resource group of the plurality of resource groups in transmission of only positive SR without separate resource reservation for transmitting only positive SR For example, a resource corresponding to a {NACK} and/or {NACK, NACK} state of a resource group with a lowest index of a resource index may be used to transmit only positive SR. As another example, a specific resource in one resource group of resource groups having a predetermined/predefined number (e.g., 2 or 4) may be used transmit only positive SR.

The aforementioned proposed methods may be included in one of embodiments of the present invention and, thus, may be considered as a type of proposed methods. The aforementioned proposed methods may be independently embodied but may be embodied in a combination (or union) of some of the proposed methods. A rule may be defined to indicate information on whether the proposed methods are applied (or information on the rule of the proposed methods) to a UE through a predefined signal (e.g., a physical layer signal or a high layer signal).

Figure 9:
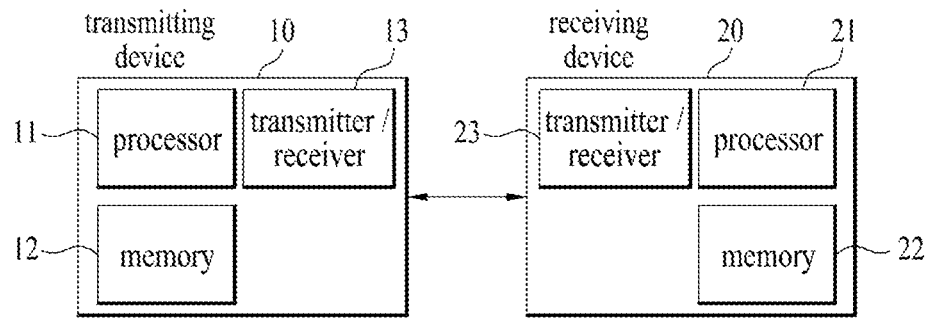
FIG. 9 is a block diagram showing an apparatus for embodying embodiment(s) of the present invention.

FIG. 9 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

As one of these embodiments, a method of transmitting a scheduling request (SR) for a UE for supporting a plurality of transmission time interval (TTI) lengths in a wireless communication system may be performed by the UE and may include receiving downlink data, and transmitting a hybrid automatic retransmission request-acknowledgement/non-acknowledgement (HARQ-ACK) on a first physical uplink control channel (PUCCH) with a first TTI length for transmission of the HARQ-ACK corresponding to the downlink data when transmission timings of the first PUCCH and a second PUCCH for transmission of SR overlap with each other. When the first PUCCH may include a smaller number of symbols than the second PUCCH and does not include an effective SR resource, the SR may not be transmitted.

Here, when the first PUCCH includes an effective SR resource, the SR may be transmitted on the first PUCCH.

The SR may include a request or a resource configuration request for uplink transmission that does not require uplink grant.

The SR may be represented by a plurality of bits and each state represented by the plurality of bits may be linked with a HARQ process number associated with the uplink transmission.

The SR may be represented by a plurality of bits and a HARQ process number associated with the uplink transmission may be determined according to a combination of the plurality of bits and a resource for transmitting the uplink transmission.

When transmission timings of the SR and the HARQ-ACK and a transmission timing of buffer state report (BSR) overlap with each other, two types of information of the SR, the HARQ-ACK, and the BSR may be bundled and may be mapped to a state of a modulation symbol to be transmitted.

When transmission timings of the SR and the HARQ-ACK and a transmission timing of buffer state report (B SR) overlap with each other, all of the SR, the HARQ-ACK, and the BSR may be transmitted on the first PUCCH using a modified PUCCH format or a larger number of resource blocks.

In addition, the SR may be for a specific service or specific requirement and a time interval or period of the effective SR resource may be smaller than a time interval or period of an SR resource for general data traffic.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention can be used for such a wireless communication device as a terminal, a relay, a base station, and the like.

The invention claimed is:

1. A method of transmitting control information for a terminal supporting transmission time intervals (TTIs) of different lengths in a wireless communication system, the method performed by the terminal and comprising:

in a state in which (i) a scheduling request (SR) is prepared as part of a transmission of a first TTI-based physical uplink control channel (PUCCH), and (ii) the first TTI-based PUCCH overlaps in time with a second TTI-based PUCCH, where a number of symbols in the second TTI is less than a number of symbols in the first TTI:
dropping the transmission of the first TTI-based PUCCH;
determining whether to transmit the SR on the second TTI-based PUCCH based on whether the second TTI-based PUCCH coincides with a second TTI-based SR transmission instance; and
based on the second TTI-based PUCCH not coinciding with the second TTI-based SR transmission instance, not transmitting the SR on the second TTI-based PUCCH.

2. The method according to claim 1, wherein in the state in which the first TTI-based PUCCH overlaps in time with the second TTI-based PUCCH and based on the second TTI-based PUCCH coinciding with the second TTI-based SR transmission instance, the SR is transmitted on the second TTI-based PUCCH.

3. The method according to claim 1, wherein the SR comprises a request or a resource configuration request for uplink transmission that does not require uplink grant.

4. The method according to claim 3, wherein the SR is represented by a plurality of bits; and
wherein each state represented by the plurality of bits is linked with a hybrid-automatic-repeat-request (HARQ) process number associated with the uplink transmission.

5. The method according to claim 3, wherein the SR is represented by a plurality of bits; and
wherein a HARQ process number associated with the uplink transmission is determined according to a combination of the plurality of bits and a resource for transmitting the uplink transmission.

6. The method according to claim 1, further comprising:
in the state in which the first TTI-based PUCCH overlaps in time with the second TTI-based PUCCH and based on the second TTI-based PUCCH coinciding with the second TTI-based SR transmission instance:
bundling and mapping, to a state of a modulation symbol to be transmitted, two types of information of (i) the SR, (ii) HARQ acknowledgment/non-acknowledgment (HARQ-ACK/NACK), and (iii) a buffer state report (BSR).

7. The method according to claim 1, further comprising:
in the state in which the first TTI-based PUCCH overlaps in time with the second TTI-based PUCCH and based on the second TTI-based PUCCH coinciding with the second TTI-based SR transmission instance:
transmitting, on the second TTI-based PUCCH using a modified PUCCH format or a greater number of resource blocks, (i) the SR, (ii) HARQ-ACK/NACK, and (iii) a BSR.

8. The method according to claim 1, wherein the SR is for a specific service or a specific requirement, and
wherein a time interval or a time period of the second TTI-based SR transmission instance is shorter than a time interval or a time period of an SR transmission instance timing for general data traffic.

9. A terminal configured to transmit control information in a wireless communication system, the terminal supporting transmission time intervals (TTIs) of different lengths, the terminal comprising:
a receiver and a transmitter;
at least one processor; and
at least one computer memory operably connectable to the at least one processor and storing instructions that, when executed by the at least one processor, perform operations comprising:
in a state in which (i) a scheduling request (SR) is prepared as part of a transmission of a first TTI-based physical uplink control channel (PUCCH), and (ii) the first TTI-based PUCCH overlaps in time with a second TTI-based PUCCH, where a number of symbols in the second TTI is less than a number of symbols in the first TTI:
dropping the transmission of the first TTI-based PUCCH;
determining whether to transmit the SR on the second TTI-based PUCCH based on whether the second TTI-based PUCCH coincides with a second TTI-based SR transmission instance; and
based on the second TTI-based PUCCH not coinciding with the second TTI-based SR transmission instance, not transmitting the SR on the second TTI-based PUCCH.

10. The terminal according to claim 9, wherein in the state in which the first TTI-based PUCCH overlaps in time with the second TTI-based PUCCH and based on the second TTI-based PUCCH coinciding with the second TTI-based SR transmission instance, the SR is transmitted on the second TTI-based PUCCH.

11. The terminal according to claim 9, wherein the SR comprises a request or a resource configuration request for uplink transmission that does not require uplink grant.

12. The terminal according to claim 11, wherein the SR is represented by a plurality of bits; and
wherein each state represented by the plurality of bits is linked with a hybrid-automatic-repeat-request (HARQ) process number associated with the uplink transmission.

13. The terminal according to claim 11, wherein the SR is represented by a plurality of bits; and
wherein a HARQ process number associated with the uplink transmission is determined according to a combination of the plurality of bits and a resource for transmitting the uplink transmission.

14. The terminal according to claim 9, wherein the operations further comprise:
in the state in which the first TTI-based PUCCH overlaps in time with the second TTI-based PUCCH and based on the second TTI-based PUCCH coinciding with the second TTI-based SR transmission instance:
bundling and mapping, to a state of a modulation symbol to be transmitted, two types of information of (i) the SR, (ii) HARQ acknowledgment/non-acknowledgment (HARQ-ACK/NACK), and (iii) a buffer state report (BSR).

15. The terminal according to claim 9, wherein the operations further comprise:
in the state in which the first TTI-based PUCCH overlaps in time with the second TTI-based PUCCH and based on the second TTI-based PUCCH coinciding with the second TTI-based SR transmission instance:
transmitting, on the second TTI-based PUCCH using a modified PUCCH format or a greater number of resource blocks, (i) the SR, (ii) HARQ-ACK/NACK, and (iii) a BSR.

16. The terminal according to claim 9, wherein the SR is for a specific service or a specific requirement, and
wherein a time interval or a time period of the second TTI-based SR transmission instance is shorter than a time interval or a time period of an SR transmission instance timing for general data traffic.

17. A method of receiving control information that is transmitted by a terminal supporting transmission time intervals (TTIs) of different lengths in a wireless communication system, the method performed by a base station (BS) and comprising:

in a state in which (i) a scheduling request (SR) is prepared by the terminal as part of a transmission of a first TTI-based physical uplink control channel (PUCCH), and (ii) the first TTI-based PUCCH overlaps in time with a second TTI-based PUCCH, where a number of symbols in the second TTI is less than a number of symbols in the first TTI:
  not receiving transmission of the first TTI-based PUCCH; and
  based on the second TTI-based PUCCH not coinciding with a second TTI-based SR transmission instance, not receiving the SR on the second TTI-based PUCCH.

18. The method according to claim 1, wherein the first TTI-based PUCCH overlaps in time with the second TTI-based PUCCH by completely or partially overlapping.

19. The terminal according to claim 9, wherein the first TTI-based PUCCH overlaps in time with the second TTI-based PUCCH by completely or partially overlapping.

20. At least one non-transitory computer-readable storage medium encoded with at least one computer program comprising instructions that, when executed by at least one processor, perform operations of transmitting control information in a terminal supporting transmission time intervals (TTIs) of different lengths, the operations comprising:

in a state in which (i) a scheduling request (SR) is prepared as part of a transmission of a first TTI-based physical uplink control channel (PUCCH), and (ii) the first TTI-based PUCCH overlaps in time with a second TTI-based PUCCH, where a number of symbols in the second TTI is less than a number of symbols in the first TTI:
  dropping the transmission of the first TTI-based PUCCH;
  determining whether to transmit the SR on the second TTI-based PUCCH based on whether the second TTI-based PUCCH coincides with a second TTI-based SR transmission instance; and
  based on the second TTI-based PUCCH not coinciding with the second TTI-based SR transmission instance, not transmitting the SR on the second TTI-based PUCCH via a transceiver of the terminal.

* * * * *